United States Patent
Boxwell et al.

(10) Patent No.: US 11,048,878 B2
(45) Date of Patent: Jun. 29, 2021

(54) DETERMINING ANSWERS TO A QUESTION THAT INCLUDES MULTIPLE FOCI

(71) Applicant: INTERNATIONAL BUSINESS MACHINES CORPORATION, Armonk, NY (US)

(72) Inventors: Stephen A. Boxwell, Dublin, OH (US); Stanley J. Vernier, Grove City, OH (US); Keith G. Frost, Delaware, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/969,154

(22) Filed: May 2, 2018

(65) Prior Publication Data
US 2019/0340239 A1 Nov. 7, 2019

(51) Int. Cl.
*G06F 17/00* (2019.01)
*G06F 40/30* (2020.01)
(Continued)

(52) U.S. Cl.
CPC ............ *G06F 40/30* (2020.01); *G06F 40/289* (2020.01); *G06N 3/006* (2013.01); *G06N 20/00* (2019.01)

(58) Field of Classification Search
CPC .... G06F 40/30; G06F 40/284; G06F 16/3329; G06F 16/3344; G06F 16/90332;
(Continued)

(56) References Cited

U.S. PATENT DOCUMENTS

| 5,873,056 A | 2/1999 | Liddy et al. |
| 6,766,320 B1 | 7/2004 | Wang et al. |

(Continued)

FOREIGN PATENT DOCUMENTS

| WO | 2013142493 A1 | 9/2013 | |
| WO | WO-2017090051 A1 * | 6/2017 | ........... G06N 3/0472 |

OTHER PUBLICATIONS

P. Pakray, P. Bhaskar, S. Banerjee, B. Pal, A. Gelbukh, S. Bandyopadhyay: A Hybrid Question Answering System based onInformation Retrieval and Answer Validation, In: the proceedings of Question Answering for Machine Reading Evaluation(QA4MRE) at CLEF 2011, Amsterdam. (2011) (Year: 2011).*

(Continued)

*Primary Examiner* — Michael Ortiz-Sanchez
(74) *Attorney, Agent, or Firm* — Conley Rose, P.C.

(57) ABSTRACT

A method includes: receiving a question including multiple foci; determining one or more passages (OMPs) that include one or more sets of candidate answers (OMSCAs) to the question; determining matchings between words in the question and words in the OMPs; determining skipngrams of the question ("first skipngrams"); determining one or more sets of skipngrams of the OMPs ("second skipngrams"); determining one or more matching numbers (OMMNs) for the second skipngrams by determining, for each set of the second skipngrams and using the matchings, a number of the first skipngrams that match skipngrams of the set of skipngrams; determining a feature input to a machine learning model (MLM) using the OMMNs; determining one or more answers (OMAs) to the question by determining, by the MLM, whether the OMSCAs are correct answers to the question based at least in part on the feature input; and sending the OMAs to a user device.

20 Claims, 4 Drawing Sheets

(51) Int. Cl.
*G06N 3/00* (2006.01)
*G06N 20/00* (2019.01)
*G06F 40/289* (2020.01)

(58) Field of Classification Search
CPC ............ G06F 16/24522; G06F 16/338; G06F 16/334; G06F 40/00; G06F 40/289; G06F 16/243; G06F 16/3334; G06F 40/20; G06F 16/00; G06F 16/248; G06F 16/33; G06F 16/3338; G06F 16/9032; G06F 16/90335; G06F 16/24; G06F 16/242; G06F 16/2455; G06F 40/216; G06F 16/3347; G06F 40/205; G06F 16/532; G06F 17/16; G06F 17/18; G06F 40/268; G06N 20/00; G06N 5/003; G10L 15/18
See application file for complete search history.

(56) References Cited

U.S. PATENT DOCUMENTS

| | | | |
|---|---|---|---|
| 7,844,598 | B2 | 11/2010 | Masuichi et al. |
| 8,332,394 | B2 | 12/2012 | Fan et al. |
| 9,679,051 | B2 | 6/2017 | Barker et al. |
| 9,798,820 | B1* | 10/2017 | Premont-Schwarz ....................... G06F 16/9535 |
| 9,852,213 | B2 | 12/2017 | Brown et al. |
| 2005/0060301 | A1 | 3/2005 | Seiki et al. |
| 2006/0204945 | A1* | 9/2006 | Masuichi ................. G09B 7/02 434/322 |
| 2009/0292687 | A1* | 11/2009 | Fan .......................... G06N 5/02 |
| 2012/0131031 | A1* | 5/2012 | Xie ..................... G06F 16/3338 707/765 |
| 2016/0147871 | A1* | 5/2016 | Kalyanpur ........ G06F 16/24522 707/728 |
| 2016/0179934 | A1* | 6/2016 | Stubley .................... G06N 5/00 707/722 |
| 2016/0180217 | A1* | 6/2016 | Boston .............. G06F 16/24578 706/46 |
| 2016/0246874 | A1* | 8/2016 | Brown ................ G06F 16/3329 |
| 2017/0011116 | A1* | 1/2017 | Liu ..................... G06F 16/3329 |
| 2017/0140034 | A1* | 5/2017 | Kalyanpur ............... G06N 5/04 |
| 2017/0308613 | A1* | 10/2017 | Zhu ...................... G06F 16/9535 |
| 2017/0323204 | A1* | 11/2017 | Akbulut ................ G06F 16/334 |
| 2018/0196796 | A1* | 7/2018 | Wu .......................... G06N 20/10 |
| 2019/0132274 | A1* | 5/2019 | Seshiah ................... G06F 16/33 |
| 2019/0221204 | A1* | 7/2019 | Zhang ..................... G06F 16/93 |

OTHER PUBLICATIONS

Bram Jans, Steven Bethard, Ivan Vulić, and Marie Francine Moens. 2012. Skip n-grams and ranking functions for predicting script events. In Proceedings of the 13th Conference of the European Chapter of the Association for Computational Linguistics (EACL '12) (Year: 2012).*

Matthew Mitsui and Chirag Shah. 2016. Multi-Word Generative Query Recommendation Using Topic Modeling. In Proceedings of the 10th ACM Conference on Recommender Systems (RecSys '16). Association for Computing Machinery, New York, NY, USA, 27-30. DOI:https://doi.org/10.1145/2959100.2959154 (Year: 2016).*

Yasuharu Matsuda, and Takashi Yukawa "Synthesis of Multiple Answer Evaluation Measures using a Machine Learning Technique for a QA System," Proceedings of NTCIR-5 Workshop Meeting, Dec. 6-9, 2005, Tokyo, Japan, 7 pages. Retrieved from Internet using: http://research.nii.ac.jp/ntcir/workshop/OnlineProceedings5/data/QAC/NTCIR5-QAC-MatsudaY.pdf.

* cited by examiner

DETERMINING ANSWERS TO A QUESTION THAT INCLUDES MULTIPLE FOCI

BACKGROUND

Question/answering systems are systems that automatically answer questions that are sometimes posed by humans in a natural language. Statements or questions presented to a question/answering system may include multiple foci. A question/answering system may not be able to determine answers for all of the multiple foci of the question.

SUMMARY

According to an aspect of the present disclosure, a computer-implemented method includes receiving a question including multiple foci. The method includes determining one or more passages from a text corpus that include one or more sets of candidate answers to the question. The method includes determining matchings between words in the question and words in the one or more passages. The method includes determining skipngrams of the question. The method includes determining one or more sets of skipngrams of the one or more passages. The method includes determining one or more matching numbers for the one or more sets of the skipngrams by determining, for each set of the one or more sets of skipngrams and using the matchings, a number of the skipngrams of the question that match skipngrams of the set of skipngrams. The method includes determining a feature input to a machine learning model using the one or more matching numbers. The method includes determining one or more answers to the question by determining, by the machine learning model, whether the one or more sets of candidate answers are correct answers to the question based at least in part on the feature input.

According to an aspect of the disclosure, a non-transitory computer readable storage media stores instructions that, when executed by a computer, cause the computer to receive a question including multiple foci. The instructions, when executed by the computer, cause the computer to determine one or more passages from a text corpus that include one or more sets of candidate answers to the question. The instructions, when executed by the computer, cause the computer to determine matchings between words in the question and words in the one or more passages. The instructions when executed by the computer, cause the computer to determine skipngrams of the question. The instructions, when executed by the computer, cause the computer to determine one or more sets of skipngrams of the one or more passages. The instructions, when executed by the computer, cause the computer to determine one or more matching numbers for the one or more sets of the skipngrams by determining, for each set of the one or more sets of skipngrams and using the matchings, a number of the skipngrams of the question that match skipngrams of the set of skipngrams. The instructions, when executed by the computer, cause the computer to determine a feature input to a machine learning model using the one or more matching numbers. The instructions, when executed by the computer, cause the computer to determine one or more answers to the question by determining, using the machine learning model, whether the one or more sets of candidate answers are correct answers to the question based at least in part on the feature input.

According to an aspect of the disclosure, a computer system includes memory storing program instructions. The computer system additionally includes a processor coupled to the memory and configured to execute the program instructions stored on the memory to cause the processor to receive a question including multiple foci. The program instructions stored on the memory cause the processor to determine one or more passages from a text corpus that include one or more sets of candidate answers to the question. The program instructions cause the processor to determine matchings between words in the question and words in the one or more passages. The program instructions cause the processor to determine skipngrams of the question. The program instructions cause the processor to determine one or more sets of skipngrams of the one or more passages. The program instructions cause the processor to determine one or more matching numbers for the one or more sets of the skipngrams by determining, for each set of the one or more sets of skipngrams and using the matchings, a number of the skipngrams of the question that match skipngrams of the set of skipngrams. The program instructions cause the processor determine a feature input to a machine learning model using the one or more matching numbers. The program instructions cause the processor to determine one or more answers to the question by determining, using the machine learning model, whether the one or more sets of candidate answers are correct answers to the question based at least in part on the feature input.

DETAILED DESCRIPTION

Figure 1:
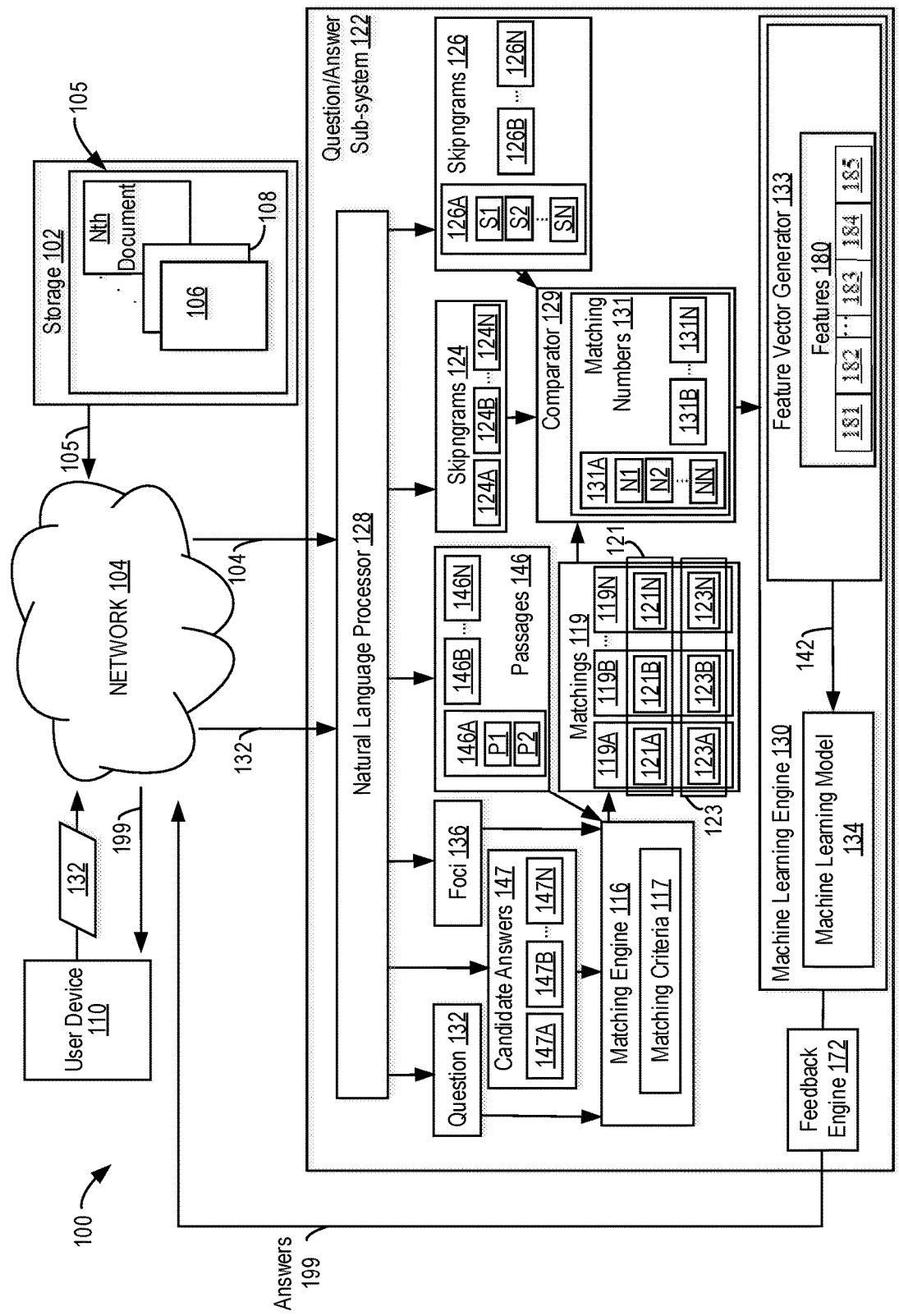
FIG. 1 is a block diagram view of an embodiment of a system according to the present disclosure.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

An engine as referenced herein may comprise of software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The engine may be configured to use the data to execute one or more instructions to perform one or more tasks.

Embodiments of the disclosure include a system that determines whether a set of candidate answers determined for a question that includes multiple foci is correct. The system efficiently compares groups of words in the question with groups of words in a passage that includes the set of candidate answers to determine a number of the groups of words in the question that match the groups of words in the passage. The system determines whether a group of words in the question matches a group of words in the passage using predetermined matchings for each word pair formed of a word in the question and a word in the passage. The predetermined matchings may be stored (e.g., in a matrix) and referenced by the system to compare the groups of words in the question with the groups of words in the passage. The system determines a feature value associated with the set of candidate answers based on the number of the groups of words in the question that match the groups of words in the passage. The system feeds the feature value to a machine learning model, and the machine learning model determines whether the set of candidate answers is correct based at least in part on the feature value.

FIG. 1 illustrates an example of a system 100 configured to determine an answer to a question 132. The system 100 includes a user device 110 that provides the question 132 to a question/answer sub-system 122. In the example illustrated in FIG. 1, the user device 110 provides the question 132 to the question/answer sub-system 122 via the network 104. However, the user device 110 may provide the question 132 to the question/answer sub-system 122 using a different communication means.

The question 132 includes multiple foci 136 that correspond to the information sought by the question 132. To illustrate, as an example, the question 132 may correspond to the question "What cities are the capitals of what countries?". In this example, the question 132 seeks entities "cities" and "countries" that are in a relation "capitals of" defined by the question 132. Thus, in this example, the multiple foci 136 of the question 132 correspond to "cities" and "countries." The system 100 includes a natural language processor 128 configured to process the question 132 to determine the multiple foci 136 of the question 132 as well as the relation.

The system 100 includes a storage 102 that includes a text corpus 105. The natural language processor 128 is configured to determine one or more passages 146 from the text corpus 105. The one or more passages 146 may be determined using a search index (not illustrated), e.g., Apache solar, Elastic Search. For example, the search index may index passages in the text corpus 105 according to keyword, and the natural language processor 128 may query the search index to determine passages that include words corresponding to the foci 136 and/or one or more words corresponding to the relation defined by the question 132. To illustrate using the above example of the question 132, the search index may index passages A, B, C, and D with the word "cities", may index passages B, C, D, and E with the word "countries", and may index passages C and D with the word "capital". In this example, the natural language processor 128 may query the search index using the foci 136 and the word corresponding to the relation defined by the question 132 (e.g., the word "capital") to determine passages C and D that include the word "cities", the word "countries", and the keyword "capital". In this example, the one or more passages 146 correspond to the passages C and D.

The one or more passages 146 include one or more sets of candidate answers 147. The natural language processor 128 may process the one or more passages 146 to identify the one or more sets of candidate answers 147. To illustrate using the above example of the question 132, the one or more passages 146 may include first passages 146A that include a passage P1 corresponding to "Abuja, the capital city of Nigeria, is a separate entity counted not as one of the states of the country, but rather as a federal capital territory," and a passage P2 corresponding to "Some planned capitals include Abuja, Nigeria (1991)". In this example, the natural language processor 128 may process the passage P1 and the passage P2 to identify first candidate answers 147A corresponding to "Abuja, Nigeria". As another example, the one or more passages 146 may include second passages 146B that include a passage corresponding to "Athens was made the capital of Greece in 1834, four years after the country gained its independence". The natural language processor 128 may process this passage to identify second candidate answers 147B corresponding to "Athens, Greece." As another example, the one or more passages 146 may include Nth passages 146N that include a passage corresponding to "Brasilia is the federal capital of Brazil and seat of government of the Federal District". The natural language processor 128 may process this passage to identify Nth candidate answers 147N corresponding to "Brasilia, Brazil."

The system 100 includes a matching engine 116 configured to receive the question 132, the foci 136, the one or more passages 146, and the one or more sets of candidate answers 147. The matching engine 116 is configured to determine matchings 119 between words in the question 132 and words in the one or more passages 146.

The matchings 119 may include matchings for each of the one or more sets of candidate answers 147. For example, the matchings 119 may include N matchings, where N is greater than one and corresponds to a number of the one or more sets of candidate answers 147. For example, the matchings 119 may include matchings 119A (e.g., first matchings) associated with the first passages 146A that are associated with the first candidate answers 147A. Additionally or alternatively, the matchings 119 may include matchings 119B (e.g., second matchings) associated with the second passages 146B that are associated with the second candidate answers 147B. Additionally or alternatively, the matchings 119 may include matchings 119N (e.g., Nth matchings) associated with the Nth passages 146N that are associated with the Nth candidate answers 147N.

The matchings 119 include foci-answers matchings 121. The foci-answers matchings 121 indicate matchings between each word of the foci 136 and each word in the one or more sets of candidate answers 147. The foci-answers matchings 121 include foci-answers matchings for each of the one or more sets of candidate answers 147. For example, the foci-answers matchings 121 may include first foci-answers matchings 121A for the first candidate answers 147A, second foci-answers matchings 121B for the second candidate answers 147B, and Nth foci-answers matchings 121N for the Nth candidate answers 147N. The first foci-answers matchings 121A indicate matchings between each word in the foci 136 and a corresponding word or entity of the first candidate answers 147A. In the above examples of the foci 136 (e.g., cities, countries) and the first candidate answers 147A (Abuja. Nigeria), the first foci-answers matchings 121A indicate a matching between the word "cities" in the foci 136 and the word "Abuja" in the first candidate answers 147A. The first foci-answers matchings 121A also indicate a matching between the word "countries" in the foci 136 and the word "Nigeria" in the first candidate answers 147A. The second foci-answers matchings 121B indicate matchings between each word in the foci 136 and a corresponding word or entity of the second candidate answers 147B. In the above examples of the foci 136 (e.g., cities, countries) and the second candidate answers 147B (Athens. Greece), the second foci-answers matchings 121B indicate a matching between the word "cities" in the foci 136 and the word "Athens" in the second candidate answers 147B. The second foci-answers matchings 121B also indicate a matching between the word "countries" in the foci 136 and the word "Greece" in the second candidate answers 147B. The Nth foci-answers matchings 121N indicate matchings between each word in the foci 136 and a corresponding word or entity of the Nth candidate answers 147N. In the above examples of the foci 136 (e.g., cities, countries) and the Nth candidate answers 147N (Brasilia, Brazil), the Nth foci-answers matchings 121N indicate a matching between the word "cities" in the foci 136 and the word "Brasilia" in the Nth candidate answers 147N. The Nth foci-answers matchings 121N also indicate a matching between the word "countries" in the foci 136 and the word "Brazil" in the Nth candidate answers 147N.

The foci-answers matchings 121 may be indicated using scores. For example, each matching between a word in the question 132 and a corresponding one of the foci 136 may be indicated by a score of one (1). In some examples, each of the matchings 119 may be recorded and stored in a matrix whose columns correspond to words in the question 132 and whose rows correspond to words in the passage or passages associated with a corresponding set of the one or more sets of candidate answers 147. In these examples, the scores indicating the foci-answers matchings 121 may be entered in entries at which a column corresponding to one of the foci 136 intersects a row of a corresponding candidate answer. To illustrate, Table 1 is an example of a matrix in which examples of the first matchings 119A associated with the first candidate answers 147A may be recorded and stored. In Table 1, the entry at which the word "cities" (e.g., a first of the foci 136) and the word "Abuja" (e.g., a first answer of the first candidate answers 147A) intersect is populated with a score (e.g., 1) to indicate a matching between the word "cities" and the word "Abuja". As another example, in Table 1, the entry at which the word "countries" (e.g., a second of the foci 136) and the word "Nigeria" (e.g., a second answer of the first candidate answers 147A) intersect is populated with a score (e.g., 1) to indicate a matching between the word "countries" and the word "Nigeria". Thus, in the example, determining the matchings 119 between words in the question 132 and words in the one or more passages 146 includes determining the first matchings 119A between first words (e.g., cities, countries) in the question 132 and second words (e.g., Abuja, Nigeria) in the first passages 146A, where the first words are different than the second words.

TABLE 1

|  | What | Cities | Are | The | Capitals | of | What | countries |
|---|---|---|---|---|---|---|---|---|
| Abuja | 0 | 1 | 0 | 0 | 0 | 0 | 0 | 0 |
| The | 0 | 0 | 0 | 1 | 0 | 0 | 0 | 0 |
| Capital | 0 | 0 | 0 | 0 | 1 | 0 | 0 | 0 |
| City | 0 | 1 | 0 | 0 | 0 | 0 | 0 | 0 |
| Of | 0 | 0 | 0 | 0 | 0 | 1 | 0 | 0 |

TABLE 1-continued

|  | What | Cities | Are | The | Capitals | of | What | countries |
|---|---|---|---|---|---|---|---|---|
| Nigeria | 0 | 0 | 0 | 0 | 0 | 0 | 0 | 1 |
| Is | 0 | 0 | 1 | 0 | 0 | 0 | 0 | 0 |
| a | 0 | 0 | 0 | 0 | 0 | 0 | 0 | 0 |
| separate | 0 | 0 | 0 | 0 | 0 | 0 | 0 | 0 |
| Entity | 0 | 0 | 0 | 0 | 0 | 0 | 0 | 0 |
| counted | 0 | 0 | 0 | 0 | 0 | 0 | 0 | 0 |
| not | 0 | 0 | 0 | 0 | 0 | 0 | 0 | 0 |
| as | 0 | 0 | 0 | 0 | 0 | 0 | 0 | 0 |
| one | 0 | 0 | 0 | 0 | 0 | 0 | 0 | 0 |
| of | 0 | 0 | 0 | 0 | 0 | 1 | 0 | 0 |
| the | 0 | 0 | 0 | 1 | 0 | 0 | 0 | 0 |
| States | 0 | 0 | 0 | 0 | 0 | 0 | 0 | 0 |
| of | 0 | 0 | 0 | 0 | 0 | 1 | 0 | 0 |
| the | 0 | 0 | 0 | 1 | 0 | 0 | 0 | 0 |
| country | 0 | 0 | 0 | 0 | 0 | 0 | 0 | 1 |
| but | 0 | 0 | 0 | 0 | 0 | 0 | 0 | 0 |
| rather | 0 | 0 | 0 | 0 | 0 | 0 | 0 | 0 |
| as | 0 | 0 | 0 | 0 | 0 | 0 | 0 | 0 |
| a | 0 | 0 | 0 | 0 | 0 | 0 | 0 | 0 |
| Federal | 0 | 0 | 0 | 0 | 0 | 0 | 0 | 0 |
| Capital | 0 | 0 | 0 | 0 | 1 | 0 | 0 | 0 |
| territory | 0 | 0 | 0 | 0 | 0 | 0 | 0 | 0 |
| Some | 0 | 0 | 0 | 0 | 0 | 0 | 0 | 0 |
| planned | 0 | 0 | 0 | 0 | 0 | 0 | 0 | 0 |
| capitals | 0 | 0 | 0 | 0 | 1 | 0 | 0 | 0 |
| include | 0 | 0 | 0 | 0 | 0 | 0 | 0 | 0 |
| Abuja | 0 | 1 | 0 | 0 | 0 | 0 | 0 | 0 |
| Nigeria | 0 | 0 | 0 | 0 | 0 | 0 | 0 | 1 |
| 1991 | 0 | 0 | 0 | 0 | 0 | 0 | 0 | 0 |

The matchings 119 also include question-passage matchings 123 indicating words in the question 132 that match words in the one or more passages 146. The matching engine 116 may use matching criteria 117 to determine the question-passage matchings 123.

The question-passage matchings 123 include matchings for each of the one or more passages 146. For example, the question-passage matchings 123 may include first question-passage matchings 123A for the first passages 146A, second question-passage matchings 123B for the second passages 146B, and Nth question-passage matchings 123N for the Nth passages 146N. The first question-passage matchings 123A indicate matchings between each word in the question 132 that is determined to match a word in the first passages 146A based on the matching criteria 117. The second question-passage matchings 123B indicate matchings between each word in the question 132 that is determined to match a word in the second passages 146B based on the matching criteria 117. The Nth question-passage matchings 123N indicate matchings between each word in the question 132 that is determined to match a word in the Nth passages 146N based on the matching criteria 117.

As an example, the matching criteria 117 may include first matching criteria that specifies that a matching is to be indicated when words exactly match or when one word is a plural of another word. To illustrate using the above examples of the question 132 and the first passages 146A, when the matching criteria 117 corresponds to the first criteria, the first question-passage matchings 123A indicate that the word "the" in the question 132 matches the word "the" in the first passages 146A, that the word "Capitals" in the question 132 matches the word "Capital" in the first passages 146A, that the word "of" in the question 132 matches the word "of" in the first passages 146A, that the word "are" in the question 132 matches the word "is" in the first passages 146A, and that the word "country" in the question 132 matches the word "countries" in the first passages 146A.

The question-passage matchings 123 for passages associated with a set of candidate answers may be recorded or stored in the same matrix as the foci-answers matchings 121 for the set of candidate answers. For example, the first question-passage matchings 123A may be recorded or stored in Table 1. In some examples, the matching criteria 117 specify that a score of one (1) is to be used to indicate the question-passage matchings 123. To illustrate, in Table 1, a one (1) is added at intersections of the words "the", at an intersection of the words "Capitals" and "Capital", at an intersection of the words "of", at an intersection of "are" and "is", and at an intersection of the words "country" and "countries". A zero (0) is added at other entries in the matrix except entries that have been populated with the first foci-answers matchings 121A.

The natural language processor 128 is configured to determine skipngrams 124 of the question 132. The skipngrams 124 may use any skip amount. For example, the skipngrams 124 may be 1 skip, 2 skip, 3 skip . . . or N skip n-grams. Additionally, the skipngrams 124 may use any n-gram length. For example, the skipngrams 124 may be bigrams, trigrams . . . or Ngrams. Additionally, the skipngrams 124 may be ordered or unordered skipngrams. To illustrate, using the above example of the question 132 ordered one skip bigrams, the skipngrams 124 correspond to the following: what cities, what are, cities are, cities the, are the, are capitals, the capitals, the of, capitals of, capitals what, of what, of countries, and what countries.

The natural language processor 128 is also configured to determine one or more sets of skipngrams 126 of the one or more passages 146. The one or more sets of skipngrams 126 may use any skip amount. For example, the one or more sets of skipngrams 126 may be 1 skip, 2 skip, 3 skip . . . or N skip n-grams. Additionally, the one or more sets of skipngrams 126 may use any n-gram length. For example, the one or more sets of skipngrams 126 may be bigrams, trigrams . . . or Ngrams. Additionally, the one or more sets of skipngrams 126 may be ordered or unordered skipngrams. The one or more sets of skipngrams 126 may include skipngrams 126A (e.g., first skipngrams), 126B (e.g., second skipngrams) . . . 126N (e.g., Nth skipngrams). The first skipngrams 126A may correspond to the first passages 146A, the second skipngrams 126B may correspond to the second passages 146B, and the Nth skipngrams 126N may correspond to the Nth passages 146N. The first skipngrams 126A may include multiple (e.g., N) sets of skipngrams generated using different skip lengths and/or different n-gram lengths. For example, the first skipngrams 126A corresponding to the first passages 146A may include a first set of skipngrams S1 corresponding to one skip bigrams of the first passages 146A, a second set of skipngrams S2 corresponding to one skip trigrams of the first passages 146A, and an Nth set of skipngrams SN corresponding to two skip fourgrams of the first passages 146A.

To illustrate using the example passages P1 and P2, the first set of skipngrams S1 may include one skip bigrams and may correspond to the following set of skipngrams: Abuja the, Abuja capital, the capital, the city, capital city, capital of, city of, city Nigeria, of Nigeria, of is, Nigeria is, Nigeria a, is a, is separate, a separate, a entity, separate entity, separate counted, entity counted, entity not, counted not, counted as, not as, not one, as one, as of, one of, one the, of the, of states, the states, the of, states of, states the, of the, of country, the country, the but, country but, country rather, but rather, but as, rather as, rather a, as a, as Federal, a Federal, a Capital, Federal Capital, Federal territory, capital territory, some planned, some capitals, planned capitals, planned include, capitals include, capitals Abuja, include Abuja, include Nigeria, Abuja Nigeria, Abuja 1991, Nigeria 1991. Thus, the first set of skipngrams S1 for the first passages 146A include 62 skipngrams.

The question/answer sub-system 122 includes a comparator 129 configured to determine one or more matching numbers 131 for the one or more sets of skipngrams 126 by determining, for each set of the one or more sets of skipngrams 126 and using the matchings 119, a number of the skipngrams 124 of the question 132 that match skipngrams of the set of the one or more sets of skipngrams 126. The one or more matching numbers 131 may include matching numbers 131A (e.g., first matching numbers) associated with the first passages 146A, matching numbers 131B (e.g., second matching numbers) associated with the second passages 146B . . . matching numbers 131N (e.g., Nth matching numbers) associated with the Nth passages 147N. One or more of the matching numbers 131 may include multiple matching numbers for different types of skipngrams of associated passages. For example, the first matching numbers 131A may include matching numbers N1 associated with the first set of skipngrams S1, matching numbers N2 associated with the second set of skipngrams S2 . . . matching numbers NN associated with the Nth set of skipngrams SN.

The comparator 129 is configured to determine that a skipngram of the question 132 matches a skipngram of a passage (e.g., that a skipngram pair is a matching skipngram pair) when each word in the skipngram of the question 132 matches a corresponding word in the skipngram of the passage as indicated by the matchings 119 for the word in the skipngram 124 and the corresponding word in the skipngram 126.

To illustrate using the above example of the first set of skipngrams S1 and the matrix example of Table 1, the skipngram "Of countries" of the question 132 is determined to match the skipngram "of Nigeria" based on the word "of" in the skipngram "of countries" matching the word "of" in the skipngram "of Nigeria" as indicated by a one (1) value in the entry of the matrix corresponding to the words "of" in the question 132 and the passages P1 and P2, and based on the word "countries" in the skipngram "of countries" matching the word "Nigeria" in the skipngram "of Nigeria" as indicated by a one (1) value in the entry of the matrix corresponding to the words "countries" of the question 132 and "Nigeria" in the passage P1. Thus, the skipngram pair "Of countries" and "Of Nigeria" is a matching skipngram pair. As another example, the skipngram "cities the" of the question 132 and the skipngram "Abuja the" are determined to be a matching skipngram pair based on the matchings 119 indicating that the word "cities" matches the word "Abuja" and the word "the" in the question 132 matches the word "the" in the passage P1. As another example, the skipngram "Capitals of" of the question 132 and the skipngram "capital of" in the passage P1 are determined to be a matching skipngram pair based on the matchings 119 indicating that the word "Capitals" matches the word "capital" and the word "of" in the question 132 matches the word "of" in the passage P1. As another example, the skipngram "the of" in the question 132 is determined to match the skipngram "the of" in the passage P1 based on the matchings 119 indicating that the word "the" in the question 132 matches the word "the" in the passage P1 and the word "of" in the question 132 matches the word "of" in the passage P1. As another example, the skipngram "of countries" in the question 132 is determined to match the skipngram "of country" in the passage P1 based on the matchings 119 indicating that the word "of" in the question 132 matches the word "of" in the passage P1 and the word "countries" in the question 132 matches the word "country" in the passage P1. The example results in a value of five (5) for the first matching number N1.

In an example, in addition to determining whether ordered 1-skip bigrams of the question 132 match ordered 1-skip bigrams of the passage, the question/answer sub-system 122 may determine a matching number N2 for the first passages 146A using a different type of skipngram. For example, the question/answer sub-system 122 may use unordered 1 skip bigrams. In this example, using the above example of the first passages 146A to illustrate, the comparator 129 determines the matching number N2 by determining unordered 1 skip bigrams of the question 132 that match unordered 1 skip bigrams of the passage based on the matchings 119.

As another example, in addition to determining the matching numbers N1 and N2 for the first passages 146A, the question/answer sub-system 122 may additionally determine ordered or unordered one skip trigrams of the question 132 and ordered and unordered one skip trigrams of the first passage 146A, and the comparator 129 may determine the number NN based on a number of the ordered or unordered 1 skip trigrams of the passage that match the ordered or unordered one skip trigrams of the question 132.

In an unordered skipngram, a skipngram of the question 132 that includes matching but out of order words compared to a skipngram of the passage is still determined to match the skipngram of the passage even though the matching words are out of order. For example, when an unordered skip bigram is used in the above example question and passage, the skipngram "Cities the" of the skipngrams 124 would be determined to match the skipngram "the city" of the skipngrams 126 because the words "cities" and "city" match and because the words "the" match.

In some examples, at least one of the skipngrams 124 of the question 132 includes a word representing a first of the foci 136 and does not include a word representing a first answer of the one or more sets of candidate answers 147, and at least one of the skipngrams 126 includes the word representing the first answer and does not include the word representing the first of the foci 136. In some of these examples, determining the number of the skipngrams 124 that match the skipngrams 126 includes determining that the at least one of the skipngrams 124 matches the at least one of the skipngrams 126. To illustrate, in the above example skipngrams "Of countries" and "Of Nigeria", the skipngram "of countries" includes a word (countries) representing a first of the foci 136 and does not include a word representing a first answer (Nigeria) of the first candidate answers 147A, and the skipngram "of Nigeria" includes the word (Nigeria) representing the first answer and does not include the word representing the first of the foci 136. As explained above, in this example, the skipngram "of countries" is determined to match the skipngram "of Nigeria" based on the matchings 119.

The question/answer sub-system 122 includes a machine learning engine 130. The machine learning engine 130 includes a feature vector generator 133 and a machine learning model 134. The feature vector generator 133 is configured to determine a feature input 142 to the machine learning model 134 using the one or more matching numbers 131. The feature input 142 includes one or more features 180 that the machine learning model 134 uses to determine whether the one or more sets of candidate answers 147 are correct.

Each of the one or more features 180 may correspond to, be based on, or be determined using, one of the one or more matching numbers 131. For example, the one or more features 180 may include a first feature 181 corresponding to, based on, or determined using, the matching number N1. Additionally or alternatively, the one or more features 180 may include a second feature 182 corresponding to, based on, or determined using, the matching number N2. Additionally or alternatively, the one or more features 180 may include a third feature 183 corresponding to, based on, or determined using, the matching number NN. Additionally or alternatively, the one or more features 180 may include a fourth feature 184 corresponding to, based on, or determined using, the matching number 131B. Additionally or alternatively, the one or more features 180 may include a fifth feature 185 corresponding to, based on, or determined using, the matching number 131N.

In some examples, the one or more features 180 are based on, but different than, the one or more matching numbers 131. For example, the one or more features 180 may include one or more features corresponding to a precision score. The precision score may be determined by the feature vector generator 133 by dividing a matching number for a candidate answer by a number of the skipngrams of the one or more passages 146 for the candidate answer. For example, the feature vector generator 133 may generate a precision score corresponding to the first feature 181 by dividing the matching number N1 by a number of the first set of skipngrams S1 of the first passages 146A. To illustrate using the above example of the matching number N1 (e.g., 5) and the above example of the first skipngrams 126A, the precision score corresponding to the first feature 181 may be 5/62.

The machine learning model 134 is configured to receive the feature input 142 and determine one or more answers 199 to the question 132 by determining whether the one or more sets of candidate answers 147 are correct answers to the question 132 based at least in part on the feature input 142. The machine learning model 134 may be implemented as a Bayesian model, a clustering model (e.g., k-means), an artificial neural network (e.g., perceptron, back-propagation, hopfield, radial basis function network), a deep learning network (e.g., deep boltzmann machine, deep belief network, convolutional neural network), and may include supervised learning, unsupervised learning, semi-supervised learning, and reinforcement learning.

For example, the machine learning model 134 may include a deep learning network that receives the feature input 142 and processes the feature input 142 using a deep belief network based at least in part on the one or more features 180. The machine learning model 134 may output weights or biases that the machine learning engine 130 uses to determine whether at least one of the one or more sets of candidate answers 147 is correct. To illustrate, the machine learning model 134 may be a neural network configured to determine whether the one or more sets of candidate answers 147 is correct by applying network weights or biases, along with one or more activation functions, to data passing through the neural network. The machine learning model 134 may output weights, and each of the weights may be associated with a respective candidate answer of the one or more sets of candidate answers 147. In some examples, each of the weights of the output of the machine learning model 134 is indicative of whether a corresponding candidate answer of the one or more sets of candidate answers 147 is correct. The machine learning engine 130 may determine whether each of the one or more sets of candidate answers 147 is correct based on the weights. For example, the machine learning engine 130 may determine whether a first weight output by the machine learning model 134 and corresponding to a first set of the one or more sets of candidate answers 147 satisfies a threshold, and may determine that the first candidate answers 147A is correct when the first weight satisfies the threshold.

The machine learning engine 130 may provide the one or more answers 199 to a feedback engine 172. The feedback engine 172 may output (e.g., send or transmit) the one or more answers 199 to the user device 110. For example, the feedback engine 172 may transmit the one or more answers 199 to the user device 110 via the network 104.

Figure 2:
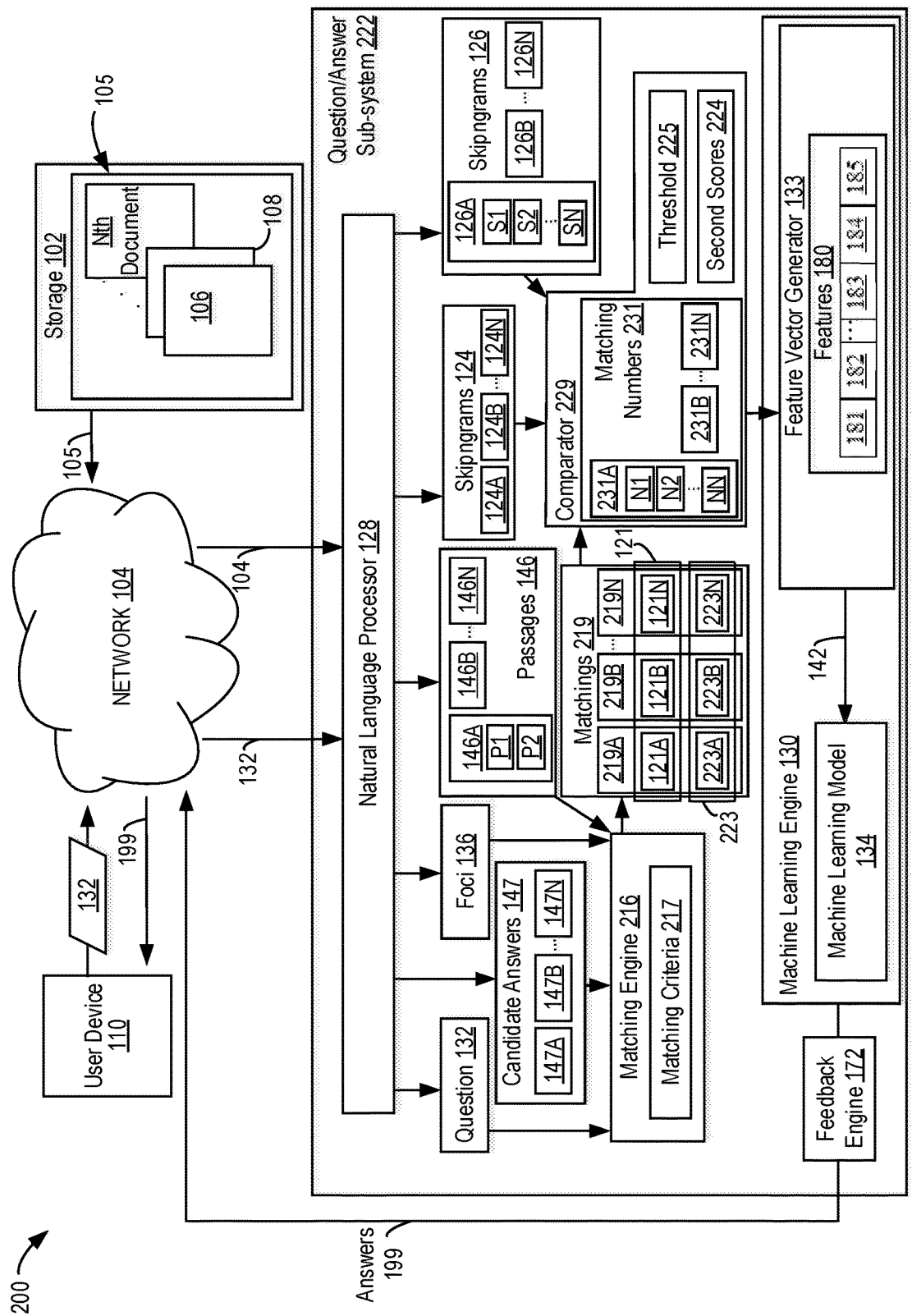
FIG. 2 is a block diagram view of another embodiment of a system according to the present disclosure.

FIG. 2 illustrates an example of a system 200 configured to determine one or more answers 199 to the question 132. The natural language processor 128 of FIG. 2 operates as described above with reference to the natural language processor 128 of FIG. 1 to receive, generate or determine the question 132, the foci 136, the one or more passages 146, the skipngrams 124, and the one or more sets of skipngrams 126. Therefore, details regarding operation of the natural language processor 128 of FIG. 2 to receive, generate or determine the question 132, the foci 136, the one or more passages 146, the skipngrams 124, and the one or more sets of skipngrams 126 of FIG. 2 are skipped during description of FIG. 2. Additionally, the machine learning engine 130 processes output from the comparator 229 of FIG. 2 as described above with reference to the output of the comparator 129 of FIG. 1 to generate the answers 199 of FIG. 2. Therefore, details regarding the machine learning engine 130 processing the output from the comparator 229 to determine the one or more answers 199 of FIG. 2 are skipped during description of FIG. 2.

In general, the differences between the system 200 and the system 100 reside in the matching engine 216 and the comparator 229. In particular, the differences between the system 200 of FIG. 2 and the system 100 of FIG. 1 include that the matching engine 216 of the system 200 uses a range of scores to indicate question-passage matchings 223 in lieu of or in addition to the binary matching technique used by the matching engine 116 of FIG. 1 to determine the question-passage matchings 123. Another difference between the system 200 and the system 100 is that the comparator 229 of the system 200 determines second scores 224 for skipngram pairs and compares the second scores 224 to a threshold 225 to determine whether a skipngram pair is a matching skipngram pair. These differences are described in more detail below.

In FIG. 2, the matching engine 216 indicates the question-passage matchings 223 using a range or continuum of scores. For example, a range of the scores that are available to indicate the question-passage matchings 223 may correspond to a range from zero (0) to one (1). The matching engine 216 uses matching criteria 217 to determine the question-passage matchings 223. To illustrate, the matching criteria 217 may specify that a score of one (1) is used when words exactly match or when one word is a plural of another word as described above with reference to the matching criteria 117 of FIG. 1. The matching criteria 217 may also specify that a score less than one (e.g., a score of 0.6) is used for a word pair when a word in the question 132 is a definite article and a word in a passage is an indefinite article, or vice versa. The matching criteria 217 may also specify that a score less than one (e.g., a score of 0.8) is used when a word in the question 132 is a synonym of a word in a passage. To illustrate using the above examples of the question 132 and the first passages 146A, the matching engine 216 may access (e.g., via the network 104) or store a thesaurus that indicates that the word "country" is a synonym for the word "territory". In this example, the matching engine 216 may determine that a score for the question-passage matching 223 corresponding to the word pair "countries" in the question 132 and "territory" in the passage P1 is 0.8.

The question-passage matchings 223 for a given set of the candidate answers 147 may be recorded or stored in the same matrix as the foci-answers matchings 121 for the given set of candidate answers 147. For example, the first question-passage matchings 223A may be recorded or stored in Table 2, which records the foci-answers matchings 121 at the entries corresponding to the intersections of the words Abuja/cities and Nigeria/countries as described above with reference to Table 1.

In Table 2, a score of 0.6 is added at an intersection of the word "a" from the passage P1 and "the" in the question 132 based on the word "the" in the question 132 being a definite article and the word "a" in the passage P1 being an indefinite article. Additionally or alternatively, a score of 0.8 is added at an intersection of the word "territory" in the passage P1 being a synonym of the word "countries" in the question 132. The remaining entries in Table 2 reflect the entries in Table 1 for similar reasons as described above with reference to Table 1.

TABLE 2

|  | What | Cities | Are | The | Capitals | of | What | countries |
|---|---|---|---|---|---|---|---|---|
| Abuja | 0 | 1 | 0 | 0 | 0 | 0 | 0 | 0 |
| The | 0 | 0 | 0 | 1 | 0 | 0 | 0 | 0 |
| Capital | 0 | 0 | 0 | 0 | 1 | 0 | 0 | 0 |
| City | 0 | 1 | 0 | 0 | 0 | 0 | 0 | 0 |
| Of | 0 | 0 | 0 | 0 | 0 | 1 | 0 | 0 |
| Nigeria | 0 | 0 | 0 | 0 | 0 | 0 | 0 | 1 |
| Is | 0 | 0 | 1 | 0 | 0 | 0 | 0 | 0 |
| a | 0 | 0 | 0 | 0.6 | 0 | 0 | 0 | 0 |
| separate | 0 | 0 | 0 | 0 | 0 | 0 | 0 | 0 |
| Entity | 0 | 0 | 0 | 0 | 0 | 0 | 0 | 0 |
| counted | 0 | 0 | 0 | 0 | 0 | 0 | 0 | 0 |
| not | 0 | 0 | 0 | 0 | 0 | 0 | 0 | 0 |
| as | 0 | 0 | 0 | 0 | 0 | 0 | 0 | 0 |
| one | 0 | 0 | 0 | 0 | 0 | 0 | 0 | 0 |
| of | 0 | 0 | 0 | 0 | 0 | 1 | 0 | 0 |
| the | 0 | 0 | 0 | 1 | 0 | 0 | 0 | 0 |
| States | 0 | 0 | 0 | 0 | 0 | 0 | 0 | 0 |
| of | 0 | 0 | 0 | 0 | 0 | 1 | 0 | 0 |
| the | 0 | 0 | 0 | 1 | 0 | 0 | 0 | 0 |
| country | 0 | 0 | 0 | 0 | 0 | 0 | 0 | 1 |
| but | 0 | 0 | 0 | 0 | 0 | 0 | 0 | 0 |
| rather | 0 | 0 | 0 | 0 | 0 | 0 | 0 | 0 |
| as | 0 | 0 | 0 | 0 | 0 | 0 | 0 | 0 |
| a | 0 | 0 | 0 | 1 | 0 | 0 | 0 | 0 |
| Federal | 0 | 0 | 0 | 0 | 0 | 0 | 0 | 0 |
| Capital | 0 | 0 | 0 | 0 | 1 | 0 | 0 | 0 |
| territory | 0 | 0 | 0 | 0 | 0 | 0 | 0 | 0.8 |
| Some | 0 | 0 | 0 | 0 | 0 | 0 | 0 | 0 |
| planned | 0 | 0 | 0 | 0 | 0 | 0 | 0 | 0 |
| capitals | 0 | 0 | 0 | 0 | 1 | 0 | 0 | 0 |
| include | 0 | 0 | 0 | 0 | 0 | 0 | 0 | 0 |
| Abuja | 0 | 1 | 0 | 0 | 0 | 0 | 0 | 0 |
| Nigeria | 0 | 0 | 0 | 0 | 0 | 0 | 0 | 1 |
| 1991 | 0 | 0 | 0 | 0 | 0 | 0 | 0 | 0 |

The comparator 229 of FIG. 2 is configured to determine the second scores 224 for skipngram pairs based on the foci-answers matchings 121 and the question-passage matchings 223 that correspond to words in the skipngram pairs. The second score 224 determined for a skipngram pair may correspond to a sum of the scores of the word pairs of the skipngram. To illustrate using the above example of the first set of skipngrams S1 and the matrix example of Table 2, in a first example of a second score 224, a second score 224 of two (2) is determined for the skipngram pair "Of countries" of the question 132 and "of Nigeria" of the passage P1 based on a score of one (1) for the word pair "of" in the skipngram "of countries" and "of" in the skipngram "of Nigeria", and based on a score of one (1) for the word pair "countries" in the skipngram "of countries" and the word "Nigeria" in the skipngram "of Nigeria".

In a second example of a second score 224, a second score 224 of 1.6 is determined for the skipngram pair "the capitals" of the question 132 and "a capital" of the passage P1 based on a score of 0.6 for the word pair "the" in the skipngram "the capitals" and "a" in the skipngram "a capital", and based on a score of one (1) for the word pair "capitals" in the skipngram "the capitals" and "capital" in the skipngram "a capital".

In a third example of a second score 224, a second score 224 of 0.8 is determined for the skipngram pair "of countries" of the question 132 and "capital territory" of the passage P1 based on a score of zero (0) for the word pair "of" in the skipngram "of countries" and "capital" in the skipngram "capital territory", and based on a score of 0.8 for the word pair "countries" in the skipngram "of countries" and "territory" in the skipngram "capital territory".

The comparator 229 is configured to determine one or more matching numbers 231 by determining, for each set of the one or more sets of skipngrams 126, a number of the skipngrams 124 of the question 132 that match skipngrams of the set of the one or more sets of skipngrams 126 based on the matchings 219. A skipngram 124 of the question 132 that matches a skipngram of a passage is referred to herein as a matching skipngram pair. The one or more matching numbers 231 determined for a given set of skipngrams of the one or more sets of skipngrams 126 represents a number of matching skipngram pairs determined for the skipngrams 124 and the given set of skipngrams. The comparator 229 is configured to determine whether a skipngram pair (e.g., a skipngram of the question 132 and a skipngram of a passage) is a matching skipngram pair by comparing the second score 224 for the skipngram pair to a threshold 225, and determining that the skipngram pair is a matching skipngram pair when the second score 224 for the skipngram pair satisfies (e.g., exceeds) the threshold 225.

To illustrate, the threshold 225 may correspond to 1.5. In this example, the comparator 229 compares the second score 224 (e.g., two (2)) for the skipngram pair "Of countries" of the question 132 and "of Nigeria" of the passage P1 to the threshold 225 (e.g., 1.5), and determines that the skipngram pair "Of countries" of the question 132 and "of Nigeria" of the passage P1 is a matching skipngram pair based on the second score 224 (e.g., two (2)) for the skipngram pair exceeding the threshold 225. As another example, the comparator 229 compares the second score 224 (e.g., 1.6) for the skipngram pair "the capitals" of the question 132 and "a capital" of the passage P1 to the threshold 225 (e.g., 1.5), and determines that the skipngram pair "the capitals" of the question 132 and "a capital" of the passage P1 is a matching skipngram pair based on the second score 224 (e.g., 1.6) for the skipngram pair exceeding the threshold 225. As another example, the comparator 229 compares the second score 224 (e.g., 0.8) for the skipngram pair "of countries" of the question 132 and "capital territory" of the passage P1 to the threshold 225 (e.g., 1.5), and determines that the skipngram pair "of countries" of the question 132 and "capital territory" of the passage P1 is not a matching skipngram pair based on the second score 224 (e.g., 0.8) for the skipngram pair not exceeding the threshold 225 (e.g., 1.5). The comparator 229 then provides the matching numbers to the machine learning engine 130 of FIG. 2, which uses the one or more matching numbers 231 as described above with reference to the one or more matching numbers 131 of FIG. 1 to determine the one or more answers 199.

Figure 3:
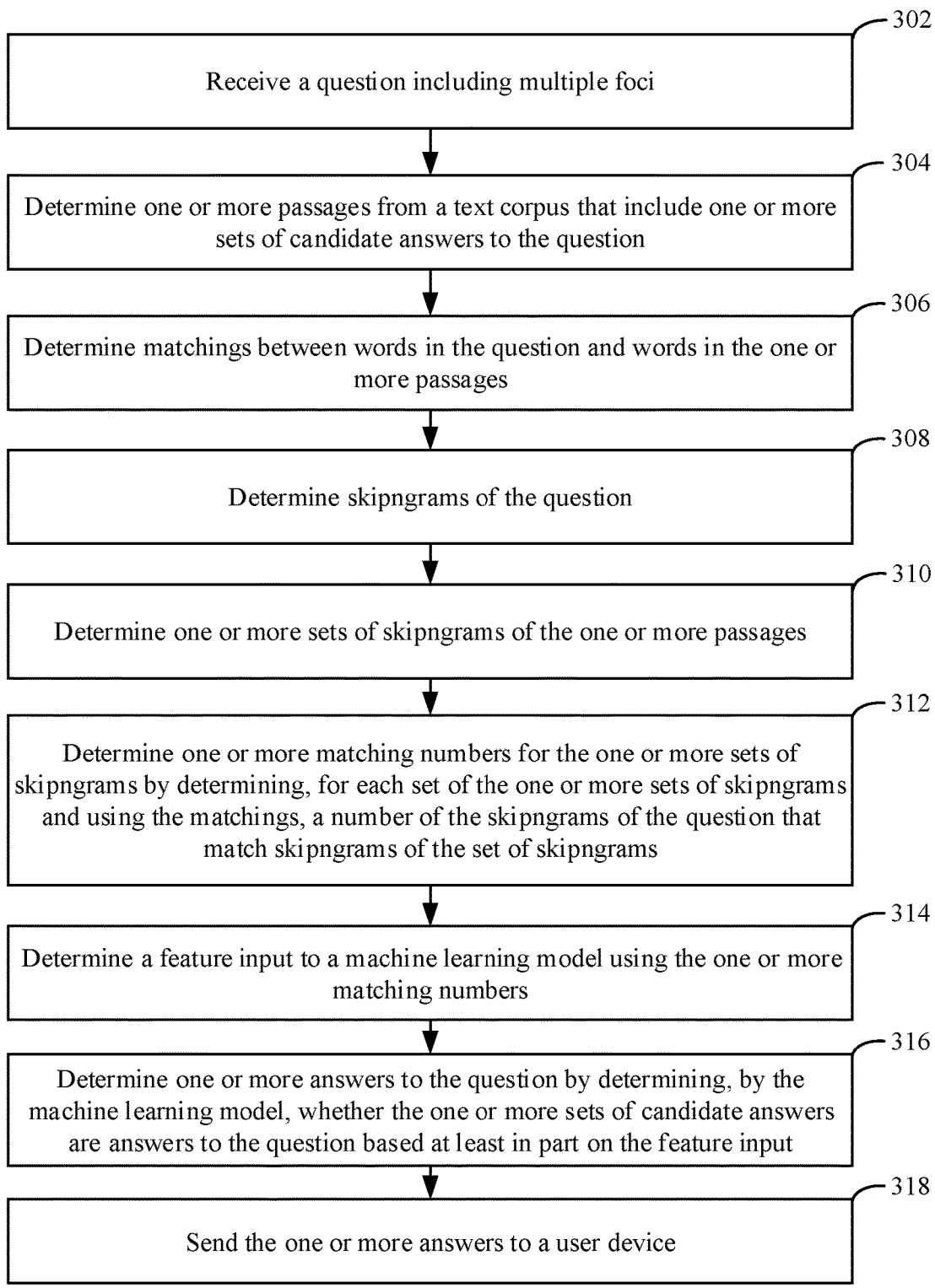
FIG. 3 is a flowchart showing an embodiment of a computer-implemented method capable of being performed, at least in part, by the system of FIG. 1.

FIG. 3 is a flowchart of a computer-implemented method 300 to determine answers to a question. The computer-implemented method 300 may be performed by one or more components of the system 100 of FIG. 1 or the system 200 of FIG. 2. In an example, the computer-implemented method 300 is performed by the question/answer sub-system 122 of FIG. 1 or the question/answer sub-system 222 of FIG. 2.

The computer-implemented method 300 includes receiving, at 302, a question including multiple foci from a user. For example, the question/answer sub-system 122 of FIG. 1 or the question/answer sub-system 222 of FIG. 2 may receive the question via the network 104. The question may correspond to the question 132 described above with reference to FIGS. 1 and 2.

The computer-implemented method 300 includes determining, at 304, one or more passages from a text corpus that include one or more sets of candidate answers to the question. For example, the one or more passages may correspond to the one or more passages 146 of FIG. 1 or 2, the one or more sets of candidate answers may correspond to the one or more sets of candidate answers 147 of FIG. 1 or 2, and the one or more passages may be determined by the natural language processor 128 of FIG. 1 or 2 as described above with reference to FIG. 1 or 2.

The computer-implemented method 300 includes determining, at 306, matchings between words in the question and words in the one or more passages. The matchings may correspond to the matchings 119 of FIG. 1, and the matchings may be determined by the matching engine 116 of FIG. 1 using the matching criteria 117 of FIG. 1 as described above with reference to FIG. 1. As another example, the matchings may correspond to the matchings 219 of FIG. 2, and the matchings may be determined by the matching engine 216 of FIG. 2 using the matching criteria 217 of FIG. 2 as described above with reference to FIG. 2.

The computer-implemented method 300 includes determining, at 308, skipngrams of the question. For example, the skipngrams of the question may correspond to the skipngrams 124 of FIG. 1 or 2, and may be determined by the natural language processor 128 of FIG. 1 or 2 as described above with reference to FIG. 1 or 2.

The computer-implemented method 300 includes determining, at 310, one or more sets of skipngrams of the one or more passages. For example, the one or more sets of skipngrams of the one or more passages may correspond to the skipngrams 126 of FIG. 1 or 2, and may be determined by the natural language processor 128 of FIG. 1 or 2 as described above with reference to FIG. 1 or 2.

The computer-implemented method 300 includes determining, at 312, one or more matching numbers for the one or more sets of skipngrams by determining, for each set of the one or more sets of skipngrams and using the matchings, a number of the skipngrams of the question that match skipngrams of the set of skipngrams. For example, the one or more matching numbers may correspond to the one or more matching numbers 131 of FIG. 1, and may be determined by the comparator 129 of FIG. 1 as described above with reference to FIG. 1. As another example, the one or more matching numbers may correspond to the one or more matching numbers 231 of FIG. 2, and may be determined by the comparator 229 of FIG. 2 as described above with reference to FIG. 2.

The computer-implemented method 300 includes determining, at 314, a feature input to a machine learning model using the one or more matching numbers. For example, the feature input may correspond to the feature input 142 of FIG. 1, and may be determined by the feature vector generator 133 of FIG. 1 using the one or more matching numbers 131 as described above with reference to FIG. 1. As another example, the feature input may correspond to the feature input 142 of FIG. 2, and may be determined by the feature vector generator 133 of FIG. 2 using the one or more matching numbers 231 as described above with reference to FIG. 2.

The computer-implemented method 300 includes determining, at 316, one or more answers to the question by determining, by the machine learning model, whether the one or more sets of candidate answers are answers to the question based at least in part on the feature input. The machine learning model may correspond to the machine learning model 134 of FIG. 1, the one or more answers may correspond to the one or more answers 199 of FIG. 1, and the machine learning model may determine the one or more answers 199 of FIG. 1 by determining whether the one or more sets of candidate answers 147 are answers to the question 132 as described above with reference to FIG. 1. As another example, the machine learning model may correspond to the machine learning model 134 of FIG. 2, the one or more answers may correspond to the one or more answers 199 of FIG. 2, and the machine learning model may determine the one or more answers 199 of FIG. 2 by determining whether the one or more sets of candidate answers 147 are answers to the question 132 as described above with reference to FIG. 2.

The computer-implemented method 300 includes sending, at 318, the one or more answers to a user device. For example, the user device may correspond to the user device 110 of FIG. 1, and the one or more answers may be sent to the user device by the feedback engine 172 as described above with reference to FIG. 1.

Figure 4:
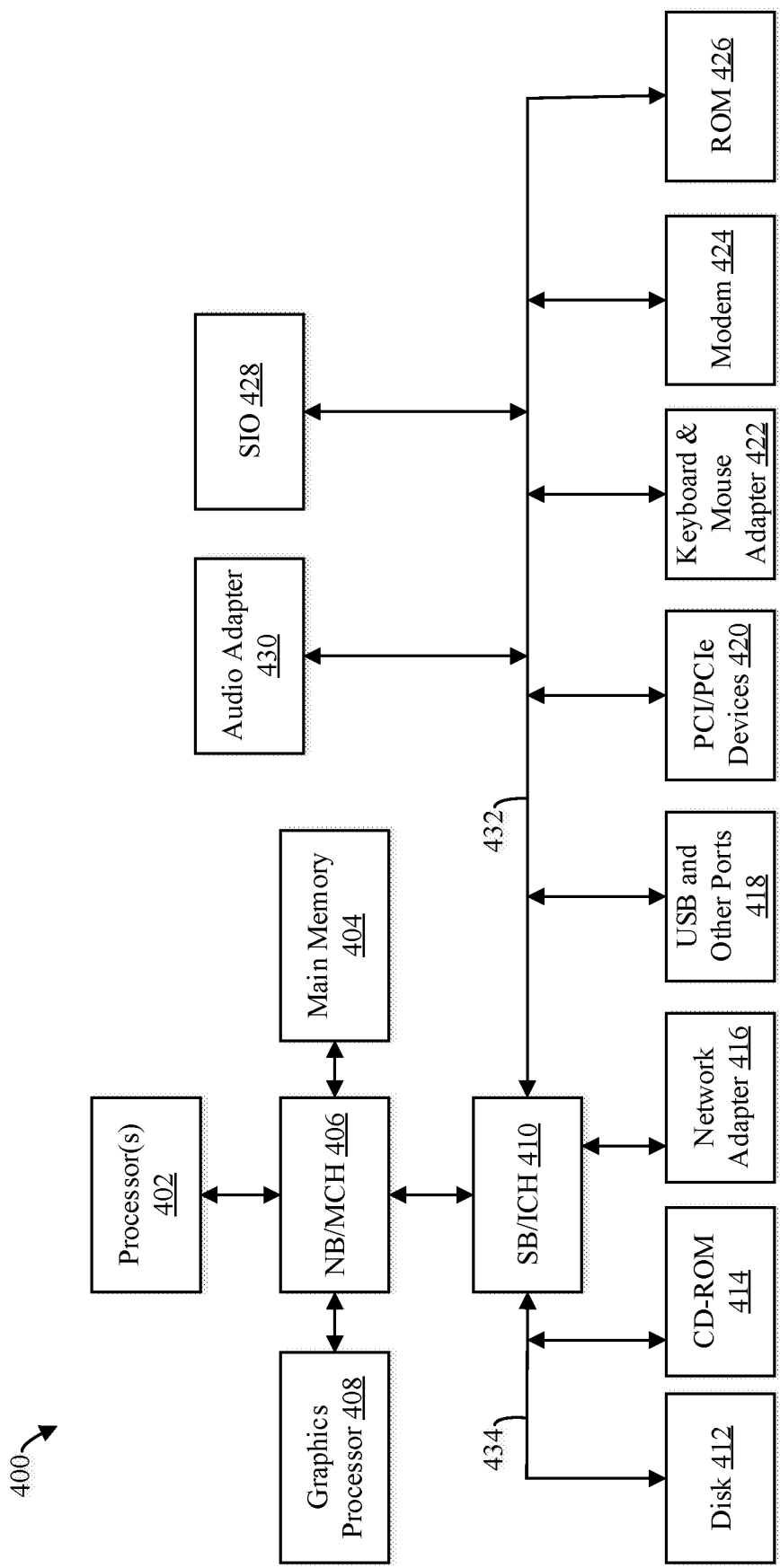
FIG. 4 shows an illustrative block diagram of an example data processing system that can be applied to implement embodiments of the present disclosure.

FIG. 4 is a block diagram of an example data processing system in which aspects of the illustrative embodiments may be implemented. Data processing system 400 is an example of a computer that can be applied to implement one or more components the system 100 of FIG. 1 (e.g., the question/answer sub-system 122 of FIG. 1) or the system 200 of FIG. 2 (e.g., the question/answer sub-system 222 of FIG. 2) and in which computer usable code or instructions implementing the processes for illustrative embodiments of the present disclosure may be located. In one illustrative embodiment, FIG. 4 represents a computing device that implements the one or more components of the system 100 of FIG. 1 (e.g., the question/answer sub-system 122 of FIG. 1) or the system 200 of FIG. 2 (e.g., the question/answer sub-system 222 of FIG. 2) augmented to include the additional mechanisms of the illustrative embodiments described hereafter.

In the depicted example, data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP).

In the depicted example, local area network (LAN) adapter 416 connects to SB/ICH 410. Audio adapter 430, keyboard and mouse adapter 422, modem 424, read only memory (ROM) 426, hard disc drive (HDD) 412, compact disc read only memory (CD-ROM) drive 414, universal serial bus (USB) ports and other communication ports 418, and peripheral component interconnect (PCI) or PCI Express (PCIe) devices 420 connect to SB/ICH 410 through bus 432 and bus 434. PCI/PCIe devices may include, for example, Ethernet adapters, add-in cards, and personal computer (PC) cards for notebook computers. PCI uses a card bus controller, while PCIe does not. ROM 426 may be, for example, a flash basic input/output system (BIOS).

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. Super I/O (SIO) device 428 may be connected to SB/ICH 410.

An operating system runs on processor(s) 402. The operating system coordinates and provides control of various components within the data processing system 400 in FIG. 4. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

In some embodiments, data processing system 400 may be, for example, an IBM® eServer™ System P® computer system, running the Advanced Interactive Executive (AIX®) operating system or the LINUX® operating system. Data processing system 400 may be a symmetric multiprocessor (SMP) system including a plurality of processors 402. Alternatively, a single processor system may be employed.

Instructions for the operating system, the object-oriented programming system, and applications or programs are located on storage devices, such as HDD 412, and may be loaded into main memory 404 for execution by processor(s) 402. The processes for illustrative embodiments of the present disclosure may be performed by processor(s) 402 using computer usable program code, which may be located in a memory such as, for example, main memory 404, ROM 426, or in one or more peripheral devices 412 and 414, for example.

A bus system, such as bus 432 or bus 434 as shown in FIG. 4, may include one or more buses. The bus system may be implemented using any type of communication fabric or architecture that provides for a transfer of data between different components or devices attached to the fabric or architecture. A communication unit, such as modem 424 or network adapter 416 of FIG. 4, may include one or more devices used to transmit and receive data. A memory may be, for example, main memory 404, ROM 426, or a cache such as found in NB/MCH 406 in FIG. 4.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, an static random access memory (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  receiving a question including multiple foci;
  determining one or more passages from a text corpus that include one or more sets of candidate answers to the question;
  determining matchings between words in the question and words in the one or more passages;

determining skipngrams based on each of the words in the question, wherein at least one skipngram comprises terms from each of the multiple foci;

determining one or more sets of skipngrams of the one or more passages;

determining one or more matching numbers for the one or more sets of the skipngrams by determining, for each set of the one or more sets of skipngrams and using the matchings, a number of the skipngrams of the question that match skipngrams of the set of skipngrams;

determining a feature input to a machine learning model using the one or more matching numbers;

determining one or more answers to the question by determining, by the machine learning model, whether the one or more sets of candidate answers are correct answers to the question based at least in part on the feature input; and sending the one or more answers to a user device.

2. The computer-implemented method of claim 1, wherein determining the matchings includes matching each word in the question that corresponds to one of the foci to a corresponding word of the one or more sets of candidate answers.

3. The computer-implemented method of claim 1, wherein determining the matchings includes determining the matchings for first candidate answers by determining first scores corresponding to foci-answers matchings indicating matchings between words of the foci and words of the first candidate answers and determining question-passage matchings indicating how well words in the question match words in the passage.

4. The computer-implemented method of claim 3, wherein determining the number of the skipngrams of the question that match skipngrams of the set of skipngrams includes determining second scores for skipngram pairs based on respective scores of the first scores that correspond to words in the skipngram pairs, and wherein each of the skipngram pairs includes one of the skipngrams of the question and one of the skipngrams of the passage.

5. The computer-implemented method of claim 4, wherein determining the number of the skipngrams of the question that match the skipngrams of the passage further includes determining that a first skipngram of the skipngrams of the question matches a second skipngram of the one or more sets of skipngrams of the one or more passages when a score of the second scores that corresponds to a skipngram pair that includes the first skipngram and the second skipngram satisfies a threshold.

6. The computer-implemented method of claim 1, wherein at least one of the skipngrams of the question includes a word representing a first of the foci and does not include a word representing a first answer of the one or more sets of candidate answers, wherein at least one of the skipngrams of the passage includes the word representing the first answer and does not include the word representing the first of the foci, and wherein determining the number of the skipngrams of the question that match the skipngrams of the passage includes determining that the at least one of the skipngrams of the question matches the at least one of the skipngrams of the passage.

7. The computer-implemented method of claim 1, wherein the feature input corresponds to a first set of the one or more sets of candidate answers, wherein the number corresponds to a first number of the skipngrams of the question that match skipngrams of a first set of skipngrams of the one or more sets of skipngrams that corresponds to the first set of the one or more sets of candidate answers, and wherein determining the feature input includes dividing the first number by a second number of skipngrams in the first set of skipngrams to determine a precision score for the first set of candidate answers.

8. The computer-implemented method of claim 1, wherein at least one skipngram of the skipngrams comprises a word with less than four letters.

9. A non-transitory computer readable storage media storing instructions that, when executed by a computer, cause the computer to:

receive a question including multiple foci;

determine one or more passages from a text corpus that include one or more sets of candidate answers to the question;

determine matchings between words in the question and words in the one or more passages;

determine skipngrams based on each of the words in the question, wherein at least one skipngram comprises terms from each of the multiple foci;

determine one or more sets of skipngrams of the one or more passages;

determine one or more matching numbers for the one or more sets of the skipngrams by determining, for each set of the one or more sets of skipngrams and using the matchings, a number of the skipngrams of the question that match skipngrams of the set of skipngrams;

determine a feature input to a machine learning model using the one or more matching numbers;

determine one or more answers to the question by determining, using the machine learning model, whether the one or more sets of candidate answers are correct answers to the question based at least in part on the feature input; and send the one or more answers to a user device.

10. The non-transitory computer readable storage media of claim 9, wherein the instructions that cause the computer to determine the matchings include instructions that cause the computer to match each word in the question that corresponds to one of the foci to a corresponding word of the one or more sets of candidate answers.

11. The non-transitory computer readable storage media of claim 9, wherein the instructions that cause the computer to determine the matchings for first candidate answers cause the computer to determine first scores corresponding to foci-answers matchings indicating matchings between words of the foci and words of the first candidate answers and determining question-passage matchings indicating how well words in the question match words in the passage.

12. The non-transitory computer readable storage media of claim 11, wherein the instructions that cause the computer to determine the number of the skipngrams of the question that match skipngrams of the set of skipngrams cause the computer to determine second scores for skipngram pairs based on respective scores of the first scores that correspond to words in the skipngram pairs, and wherein each of the skipngram pairs includes one of the skipngrams of the question and one of the skipngrams of the passage.

13. The non-transitory computer readable storage media of claim 12, wherein the instructions that cause the computer to determine the number of the skipngrams of the question that match the skipngrams of the passage cause the computer to determine that a first skipngram of the skipngrams of the question matches a second skipngram of the skipngrams of the one or more sets of skipngrams of the one or more passages when a score of the second scores that corresponds to a skipngram pair that includes the first skipngram and the second skipngram satisfies a threshold.

14. The non-transitory computer readable storage media of claim 13, wherein at least one of the skipngrams of the question includes a word representing a first of the foci and does not include a word representing a first answer of the one or more sets of candidate answers, wherein at least one of the skipngrams of the passage includes the word representing the first answer and does not include the word representing the first of the foci, and wherein the instructions that cause the computer to determine the number of the skipngrams of the question that match the skipngrams of the passage cause the computer to determine that the at least one of the skipngrams of the question matches the at least one of the skipngrams of the passage.

15. The non-transitory computer readable storage media of claim 9, wherein the feature input corresponds to a first set of the one or more sets of candidate answers, wherein the number corresponds to a first number of the skipngrams of the question that match skipngrams of a first set of skipngrams of the one or more sets of skipngrams that corresponds to the first set of the one or more sets of candidate answers, and wherein the instructions that cause the computer to determine the feature input cause the computer to divide the first number by a second number of skipngrams in the first set of skipngrams to determine a precision score for the first set of candidate answers.

16. A computer system, comprising:
memory storing program instructions; and
a processor coupled to the memory and configured to execute the program instructions stored on the memory to cause the processor to:
receive a question including multiple foci;
determine one or more passages from a text corpus that include one or more sets of candidate answers to the question;
determine matchings between words in the question and words in the one or more passages;
determine skipngrams based on each of the words in the question, wherein at least one skipngram comprises terms from each of the multiple foci;
determine one or more sets of skipngrams of the one or more passages;
determine one or more matching numbers for the one or more sets of the skipngrams by determining, for each set of the one or more sets of skipngrams and using the matchings, a number of the skipngrams of the question that match skipngrams of the set of skipngrams;
determine a feature input to a machine learning model using the one or more matching numbers;
determine one or more answers to the question by determining, using the machine learning model, whether the one or more sets of candidate answers are correct answers to the question based at least in part on the feature input; and
send the one or more answers to a user device.

17. The computer system of claim 16, wherein the program instructions that cause the processor to determine the matchings include program instructions that, when executed by the processor, cause the processor to match each word in the question that corresponds to one of the foci to a corresponding word of the one or more sets of candidate answers.

18. The computer system of claim 16, wherein the program instructions that cause the processor to determine the matchings for first candidate answers cause the processor to determine first scores corresponding to foci-answers matchings indicating matchings between words of the foci and words of the first candidate answers and determining question-passage matchings indicating how well words in the question match words in the passage.

19. The computer system of claim 18, wherein the program instructions that cause the processor to determine the number of the skipngrams of the question that match skipngrams of the set of skipngrams cause the processor to determine second scores for skipngram pairs based on respective scores of the first scores that correspond to words in the skipngram pairs, and wherein each of the skipngram pairs includes one of the skipngrams of the question and one of the skipngrams of the passage.

20. The computer system of claim 19, wherein the program instructions that cause the processor to determine the number of the skipngrams of the question that match the skipngrams of the passage cause the processor to determine that a first skipngram of the skipngrams of the question matches a second skipngram of the skipngrams of the one or more sets of skipngrams of the one or more passages when a score of the second scores that corresponds to a skipngram pair that includes the first skipngram and the second skipngram satisfies a threshold, and wherein at least one of the skipngrams of the question includes a word representing a first of the foci and does not include a word representing a first answer of the one or more sets of candidate answers, wherein at least one of the skipngrams of the passage includes the word representing the first answer and does not include the word representing the first of the foci, and wherein the program instructions that cause the processor to determine the number of the skipngrams of the question that match the skipngrams of the passage cause the processor to determine that the at least one of the skipngrams of the question matches the at least one of the skipngrams of the passage.

* * * * *